(12) United States Patent
Rafalskyi et al.

(10) Patent No.: US 12,031,528 B2
(45) Date of Patent: Jul. 9, 2024

(54) PROPELLANT TANK WITH ON-OFF CONTROL SYSTEM FOR THE FLOW OF PROPELLANT GAS AND SPACECRAFT INCORPORATING SUCH A CONTROL SYSTEM

(71) Applicant: THRUSTME, Paris (FR)

(72) Inventors: Dmytro Rafalskyi, Orsay (FR); Javier Martinez Martinez, Paris (FR)

(73) Assignee: THRUSTME, Paris (FR)

( * ) Notice: Subject to any disclaimer, the term of this patent is extended or adjusted under 35 U.S.C. 154(b) by 394 days.

(21) Appl. No.: 17/428,739

(22) PCT Filed: Feb. 4, 2020

(86) PCT No.: PCT/FR2020/050186
§ 371 (c)(1),
(2) Date: Aug. 5, 2021

(87) PCT Pub. No.: WO2020/161434
PCT Pub. Date: Aug. 13, 2020

(65) Prior Publication Data
US 2022/0128047 A1 Apr. 28, 2022

(30) Foreign Application Priority Data
Feb. 6, 2019 (FR) ...................................... 1901159

(51) Int. Cl.
*F03H 1/00* (2006.01)
*B64G 1/40* (2006.01)

(52) U.S. Cl.
CPC ........... *F03H 1/0012* (2013.01); *B64G 1/402* (2013.01); *B64G 1/413* (2023.08)

(58) Field of Classification Search
CPC .... B64G 1/402; B64G 1/4021; B64G 1/4022; B64G 1/4024; B64G 1/413; B64G 1/405; B64G 1/411
See application file for complete search history.

(56) References Cited

U.S. PATENT DOCUMENTS 6,609,363 B1 8/2003 Dressler et al.
7,059,111 B2 6/2006 King
(Continued)

FOREIGN PATENT DOCUMENTS

FR 3020235 10/2015
FR 3040442 3/2017

OTHER PUBLICATIONS

International Search Report for PCT/FR2020/050186 dated Jun. 9, 2020, 7 pages.
(Continued)

*Primary Examiner* — Joshua J Michener
*Assistant Examiner* — Arfan Y. Sinaki
(74) *Attorney, Agent, or Firm* — NIXON & VANDERHYE (57) ABSTRACT

The invention relates to a solid or liquid propellant (2) tank (1) for a thruster, the tank (1) comprising means for forming a gas (9) in the tank, the tank (1) having an opening (4) of surface area S for the extraction of a flow (20) of the propellant gas from the tank (1). According to the invention, the tank (1) comprises a propellant gas flow on-off control system comprising a grid (6) arranged opposite the opening (4) of the tank (1), a first thermal regulation system (11, 21) for heating the gas (9) in the tank and a second thermal regulation system (12, 22) for heating the grid (6), said grid (6) including holes of total surface area greater than the surface area S of the opening of the tank (1).

16 Claims, 5 Drawing Sheets

(56) References Cited

U.S. PATENT DOCUMENTS

9,334,855 B1    5/2016  Hruby et al.
2013/0026920 A1    1/2013  Szabo, Jr. et al.
2018/0216605 A1*    8/2018  Rafalskyi ................ H05H 1/54

OTHER PUBLICATIONS

Written Opinion of the ISA for PCT/FR2020/050186 dated Jun. 9, 2020, 6 pages.
Polzin et al., "Iodine Hall Thruster Propellant Feed System for a CubeSat", 50th AIAA/ASME/SAE/ASEE Joint Propulsion Conference, Jul. 28, 2014, 10 pages total.

* cited by examiner

PROPELLANT TANK WITH ON-OFF CONTROL SYSTEM FOR THE FLOW OF PROPELLANT GAS AND SPACECRAFT INCORPORATING SUCH A CONTROL SYSTEM

CROSS-REFERENCE TO RELATED APPLICATIONS

This application is the U.S. national phase of International Application No. PCT/FR2020/050186 filed Feb. 4, 2021 which designated the U.S. and claims priority to French Application No. 1901159 filed Feb. 6, 2019, the entire contents of each of which are hereby incorporated by reference.

BACKGROUND OF THE INVENTION

Field of the Invention

The present invention relates to the technical field of thrusters, in particular space thrusters. Space thrusters find applications in particular in space or astronautics field.

More precisely, the invention relates to a thruster comprising a solid or liquid propellant tank and means for controlling the flow of gas formed from the propellant.

In particular, the invention relates to an ion thruster or a plasma thruster, wherein the propellant tank is integrated into or remote from an ionization chamber, or a plasma chamber, respectively.

Description of the Related Art

In the above-mentioned field, different thruster types are known, in particular ion, cold-gas, colloid (or electrospray), Hall-effect or also field-effect (referred to as FEEP for "field-emission electric propulsion") thrusters.

Patent document FR3020235_A1 discloses an ion thruster comprising a device for forming a quasi-neutral ion-electron beam, a tank connected by a gas pipe to a plasma chamber and means for extracting and accelerating a quasi-neutral ion-electron beam out of the plasma chamber. The usable gases may be chosen, as a function of their electropositivity or electronegativity, among argon (Ar), hydrazine ($N_2H_4$), xenon (Xe), carbon tetrafluoride ($CF_4$), sulfur hexafluoride ($SF_6$), diiodine ($I_2$), dinitrogen ($N_2$) or dihydrogen ($H_2$).

Patent document U.S. Pat. No. 7,059,111 discloses a plasma thruster integrating a liquid propellant tank. However, this thruster uses an additional system of electrodes to control the flow of gas exiting from the tank.

Patent document FR3040442_A1 discloses a grid ion thruster integrating a solid propellant tank in a plasma chamber. Tank heating means are provided to sublimate the solid propellant and to form a gas inside the tank. The propellant in gaseous state enters the plasma chamber through at least one tank hole whose surface area is sized on a case-by-case basis for a set of operating parameters determined as a function of the propellant used, the pressure and the temperature. The use of a propellant stored in solid state in the tank has several advantages, in particular compactness of the tank and reliability at reduced cost. The diameter of the gas outlet hole being fixed, the control of the gaseous propellant flow rate is made by controlling the temperature of the tank, which has for drawback to show inertia. Moreover, this thruster can suffer from gas leaks when the thruster is stopped.

SUMMARY OF THE INVENTION

In order to remedy the above-mentioned drawbacks of the state of the art, the present invention proposes a thruster tank, the tank being adapted to store a solid or liquid propellant, the tank comprising means for forming a gas from the solid or liquid propellant in the tank, the tank having an opening of surface area S suitable for extracting a flow of the propellant gas from the tank.

According to the invention, the tank includes a system for on-of control of the gas flow, comprising a grid arranged opposite the opening of the tank, a first thermal regulation system suitable for regulating the temperature of the gas in the tank and a second thermal regulation system suitable for regulating the temperature of the grid, the grid including holes of total surface area greater than the surface area S of the opening of the tank, the first and second thermal regulation systems being configured to adjust a temperature difference between the temperature of the gas in the tank and the temperature of the grid, the temperature difference being variable between a first value higher than a threshold adapted for transmitting the gas flow through the grid and a second value lower than another threshold where the gas forms a solid deposit on the grid to obstruct the holes of the grid.

Other non-limitative and advantageous characteristics of the propellant tank according to the invention, taken individually or according to all the technically possible combinations, are the following.

The first thermal regulation system comprises a heating device suitable for heating the tank and/or the second thermal regulation system comprises another heating device suitable for heating the grid.

Advantageously, the heating device and/or the other heating device comprises an electric heating device, a conductive strip, a heating circuit of the heat pipe type, a fluidic convective loop, a heater, a Peltier-effect thermoelectric module and/or a phase change material (PCM) or also any other active or passive device adapted to control a heat transfer.

The second thermal regulation system further includes a device for cooling the grid.

The first thermal regulation system includes a temperature sensor for measuring a temperature representative of the gas temperature in the tank and/or the second thermal regulation system includes another temperature sensor for measuring another temperature representative of the grid temperature.

The tank includes a case and a plate, a sealing and thermal insulation device arranged between the case and the plate, the plate including the tank opening, the grid being fastened to the plate.

The grid is a wire mesh grid or the grid includes a blade comprising the holes.

The holes have a surface roughness adapted for the solid deposition of propellant.

The holes have for example a square, rectangular or diamond geometric shape. The grid holes may have a spatial distribution according to a one or two-dimensional periodic array. As an alternative, the blade holes have a spatial distribution that varies radially with respect to the center of the opening, the spatial distribution of holes being denser either in the center or at the periphery of the grid, in such as way as to distribute the exiting gas flow.

The propellant includes a component chosen among the following components: diiodine, bismuth, cesium, cadmium, tin, indium, gallium, germanium, lithium, mercury, adamantane, ferrocene, arsenic, polyvinyl chloride (PVC), polyimide (or Kapton®) or polytetrafluoroethylene (or Teflon®).

The tank can further include a regulation valve for modifying the flow rate of the gas exiting from the tank.

The invention also relates to a thruster comprising a tank according to one of the described embodiments, the thruster being chosen among the following thruster types: ion, plasma, cold-gas, colloid (electrospray), Hall-effect or field-effect thrusters.

Other non-limitative and advantageous features of the thruster according to the invention, taken individually or according to all the technically possible combinations, are the following.

The thruster being of the ion, plasma or cold-gas type, respectively, the tank is separated from an ionization chamber or a plasma chamber or an outlet nozzle, in the case of a cold-gas thruster, respectively, a gas pipe connecting the tank to the ionization chamber or the plasma chamber or the outlet nozzle, respectively.

The tank is integrated into a plasma chamber or an ionization chamber.

The invention also relates to a space craft, such as a satellite or a space probe, comprising a thruster according to one of the described embodiments.

The invention also relates to a method for on-off control of the propellant gas flow at the outlet of a tank containing a propellant stored in solid or liquid form according to one of the described embodiments, the method comprising the following steps: formation of a gas from the solid or liquid propellant in the tank, thermal regulation of the gas temperature in the tank and thermal regulation of the grid temperature, in such a way as to adjust a temperature difference between the gas temperature in the tank and the grid temperature, the temperature difference being variable between a first value higher than a threshold adapted for the transmission of the gas flow through the grid without solid deposit of propellant and a second value lower than another threshold where the gas forms a solid deposit on the grid to obstruct the grid holes.

The invention allows a rapid control of the on-off type of the gas flow exiting from the tank, for any condensable gas. In the present document, it is meant by "condensable gas" a substance capable of passing from the gaseous state to the solid state at a temperature able to be reached with the cooling means of the thruster tank or of the thruster or of the space craft integrating the tank. Moreover, the invention makes it possible to limit the gas leaks when the thruster is stopped. This on-off control of the gas flow exiting from the tank is reversible: by heating the grid, the solid deposit is sublimated and the gas flow is restored. The invention is compatible with many space thrusters. In particular, the invention finds applications in an ion thruster in which the tank is integrated to the plasma chamber or remote from the plasma chamber. The invention also finds applications in a cold-gas thruster, in which the tank constitutes the main part of the thruster.

The invention also proposes a space craft, for example a satellite or a space probe, comprising such a regulation system by on-off control of the propellant gas flow.

Of course, the different features, alternatives and embodiments of the invention can be associated with each other according to various combinations, insofar as they are not incompatible with each other or exclusive from each other.

BRIEF DESCRIPTION OF THE DRAWINGS

Moreover, various other features of the invention will be apparent from the appended description made with reference to the drawings that illustrate non-limitative embodiments of the invention, and wherein.

DESCRIPTION OF THE PREFERRED EMBODIMENTS

It is to be noted that, on these figures, the structural and/or functional elements common to the different alternatives can be denoted by the same references.

Figure 1:
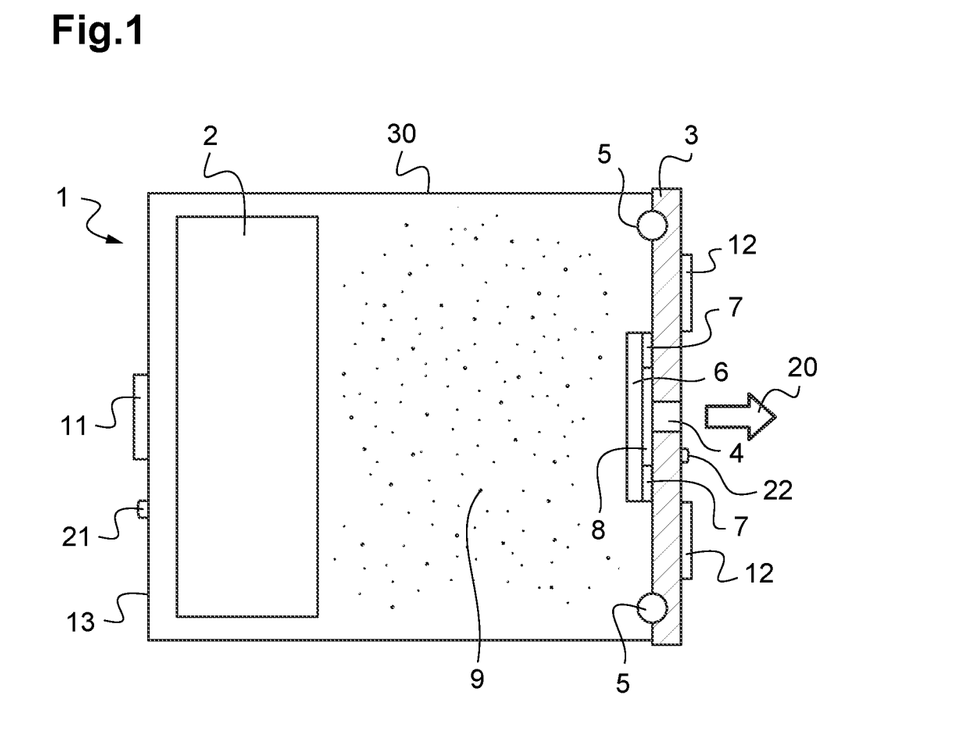
FIG. 1 is a schematic cross-sectional view of a tank provided with a propellant gas flow on-off control system according to the invention.

FIG. 1 shows a tank 1 containing a propellant 2. The propellant is stored into the tank in solid or liquid state at ambient temperature. In the present document, when the tank is on earth, the ambient temperature is between 5 and 25 degrees in the case of diiodine.

The solid or liquid propellant includes at least one chemical component chosen among the following components: diiodine ($I_2$), bismuth (Bi), cesium (Ce), cadmium (Cd), tin (Sn), indium (In), gallium (Ga), germanium (Ge), lithium (Li), mercury (Hg), adamantane (generic chemical formula: $C_{10}H_{16}$), ferrocene (generic chemical formula: $Fe(C_5H_5)_2$), arsenic, PVC, polyimide (also commercially called Kapton®) or PTFE (Polytetrafluoroethylene, of chemical formula: $(C_2F_4)_n$, also commercially called) Teflon®. Preferably, the solid propellant is diiodine ($I_2$) or a mixture of diiodine with other chemical components.

The tank 1 herein includes two parts: a case 30 and a plate 3. Propellant 2 is arranged in case 30 of tank 1. According to the thruster type, the propellant is stored in the tank in solid or liquid state. However, the propellant is preferably stored in solid state to increase the storage density, in other words to reduce the tank bulk. Case 30 has for example a cylindrical shape closed at one end by a bottom 13. Plate 3 closes the other end of case 30. Plate 3 includes at least one opening 4 having a total surface area denoted S. For example, the opening 4 is circular and has a diameter of the order of 0.1 mm, which allows generating a gas flow rate of the order of 0.05 mg/s. A leak-tight seal 5 is placed between the plate 3 and the case 30 of the tank. The seal 5 is chosen in such a way as to have a low thermal conductivity, for example about 0.05 W/(m·K), in order to thermally isolate plate 3 with respect to case 30 of tank 1. The low thermal conductivity seal 5 is for example an O-ring seal, chosen among a Viton® seal or an insulating insert made of zirconium dioxide ($ZrO_2$) or a PTFE insulator.

A grid 6 is fastened to plate 3 opposite opening 4. Grid 6 includes 16 holes. Grid 6 has a surface for growth by deposition or solidification of propellant crystals that results in a dense crystal lattice of propellant crystals partially or totally blocking the gas exit through the opening 4. As detailed hereinafter, the grid 6 is used as a support for depositing the condensable gas opposite the opening 4 in such a way as to stop the propellant gas flow and, conversely, the grid 6 is used to sublimate the crystals deposited on this grid 6 in such a way as to let the propellant gas flow pass through the opening 4.

Figure 2:
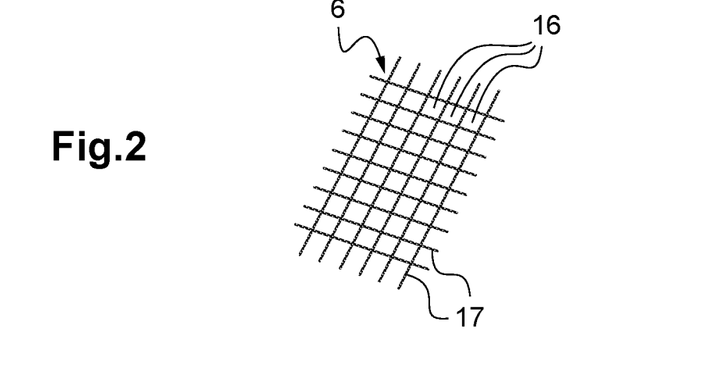
FIG. 2 is a schematic view of a wire mesh grid of a propellant gas flow regulation system according to a first embodiment.

The grid 6 has for example a regular wire mesh structure as illustrated in FIG. 2. The wire grid 6 is formed by twisted wires 17, generally metallic. The wire grid 6 is planar and located in an XY-plane in an XYZ orthonormal coordinate system. By way of non-limitative example, the grid 6 is made of tungsten. The holes 16 can be for example of square, rectangular or diamond geometrical shape.

Figure 3:
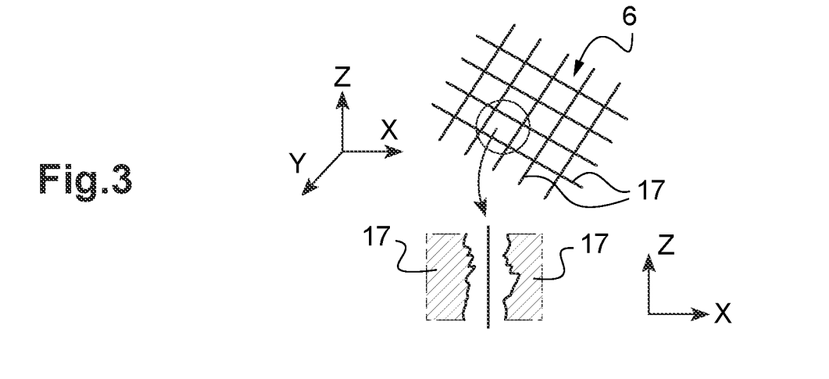
FIG. 3 is a schematic view of a wire mesh grid of a propellant gas flow regulation system according to an alternative of the first embodiment, with a cross-sectional view of a mesh whose wires have a surface roughness.

According to a particular and advantageous alternative, illustrated in FIG. 3, the wires 17 of the mesh grid have not a smooth surface but have a surface roughness (see in FIG. 3 the cross-sectional view of a detail of a mesh in an XZ-plane orthogonal to the XY-plane of the grid). This surface roughness of wires 17 around holes 16 favors the growth by deposition or solidification of propellant crystals, which makes it possible to obtain a dense crystal lattice partially or totally blocking the holes 16 of the grid 6 and hence the exit of the gas through the opening 4.

Figure 4:
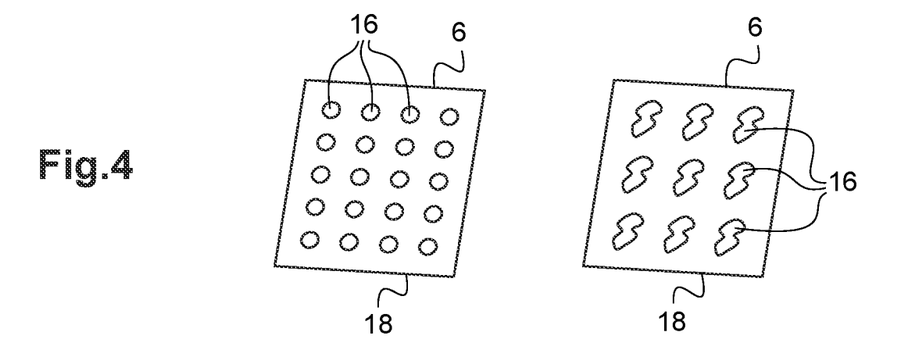
FIG. 4 shows two other examples of grids formed by machining of holes in a blade for a propellant gas flow regulation system according to a second embodiment.
Figure 5:
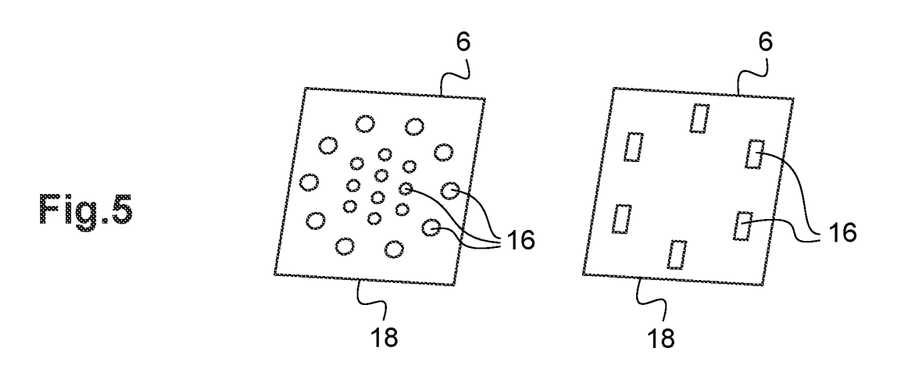
FIG. 5 shows two other examples of grids formed by machining of holes in a blade where the hole arrangement is specially adapted for a propellant gas flow regulation system according to an alternative of the second embodiment.

As an alternative, the grid is formed in a plane blade 18, for example metallic, in which holes 16 are machined (see FIGS. 4 and 5). The machined holes have a geometrical shape, for example, cylindrical or conical, of circular cross-section (see FIG. 4 on the left), square, rectangular (see FIG. 5 on the right), or also of irregular cross-section (see FIG. 4, on the right). As illustrated in FIG. 4, the holes 16 may be spatially distributed according to a two-dimensional periodic array. In an alternative illustrated in FIG. 5, the spatial distribution of the grid holes 16 is advantageously adjusted in such a way as to distribute the exiting gas flow through the opening 4. For example, the hole density is higher at the grid center or at the grid periphery (see FIG. 5).

The size of the holes 16 of grid 6, in the plane of the grid, are chosen as a function of the propellant gas mass flow rate and of the diameter of opening 4. In FIG. 4, the holes 16 of a same grid all have the same size. In FIG. 5 on the left, the size of the holes varies radially, the holes in the center having a smaller diameter than the holes located at the periphery of the grid. According to the thruster type, the diameter of opening 4 is generally between 0.05 mm and 5 mm. By way of non-limitative example, the size of holes 16 of grid 6, taken in the plane of the grid, is between 10 µm and 1 mm, for example of the order of 0.1 mm. The thickness of plate 18 is between 10 µm and 5 mm.

Whatever the structure of grid 6, the total surface area of holes 16 of grid 6 is greater than the surface area S of opening 4 of plate 3. The total surface area of holes 16 is herein taken in the plane of grid 6. Preferably, the total surface area of holes 16 of grid 6 is greater by at least one magnitude order than the total surface area S of opening 4 of plate 3. That way, when the grid holes are open, the grid 6 does not limit the gas flow rate through the opening 4.

In the example illustrated in FIG. 1, a shim 7 is placed between the grid 6 and the plate 3. The shim 7 also includes an opening of surface area greater than the surface area S of opening 4 of plate 3. The shim 7 is for example of annular shape. The grid 6 and plate 3 are sealingly fastened to shim 7. The shim 7 hence delimits a plenum between the grid 6 and the opening 4. The shim 7 avoids a contact between the grid and the inner face of plate 3. The shim 7 has for example a thickness of about 1 mm to 2 mm and an opening diameter greater by one magnitude order than the diameter of the outlet opening 4.

The tank is provided with a first thermal regulation system. The first thermal regulation system comprises a heating device 11 for example a heating circuit such as electric heating device, conductive strip, heat pipe, fluidic convective loop, heater, phase change material or Peltier-effect thermoelectric module. The heating device 11 is for example fastened outside tank 1, on the bottom 13 thereof. When propellant 2 is stored in solid state, respectively liquid state, in the tank, the heating device 11 is adapted to heat case 30 in such a way as to sublimate, respectively evaporate, propellant 2 in solid state, respectively liquid state, and to form a gas 9 of this propellant in the tank.

Advantageously, the first thermal regulation system includes a temperature sensor 21 arranged near the heating device 11, for example on bottom 13, outside tank 1. The temperature sensor 21 makes it possible to measure a temperature T1 of the tank bottom 13 that is function of the quantity of heat emitted by the first thermal regulation system 11. A calibration system and method make it possible to evaluate the temperature inside the tank as a function of the measured temperature T1.

A second thermal regulation system comprises another heating device 12, for example another heating circuit such as electric heating device, conductive strip, heat pipe, fluidic convective loop, heater, phase change material or Peltier-effect thermoelectric module. The other heating device 12 is adapted to heat plate 3 and heat grid 6 for example by conduction and/or convection. The sealing gasket 5 makes it possible to thermally isolate plate 3 with respect to tank case 30 in such a way as to be able to heat or cool plate 3 independently of case 30, and reciprocally.

Advantageously, the second thermal regulation system comprises another temperature sensor 22. The other temperature sensor 22 is arranged near grid 6 and second thermal regulation system 12, for example on plate 3, outside tank 1, and near opening 4. The other temperature sensor 22 makes it possible to measure another temperature T2 that is function of the quantity of heat emitted by the second thermal regulation system 12. The calibration system and method make it possible to evaluate the temperature of grid 6 as a function of temperature T2.

Temperature sensors 21, 22 are for example thermoresistive sensors, such as the resistive temperature sensors PT100.

Moreover, an electronic system makes it possible to adjust temperature T1 by means of the heating device 11 relatively independent of temperature T2 controlled by the other heating device 12. The heating device 11 and the other heating device 12 are connected to a source of energy (not shown). The operating temperature range of the system depends on the propellant used and of the propellant operating pressure and temperature range. The range of temperature T1 is adapted to allow the evaporation or the sublimation of the propellant in the tank. The range of temperature T2 is adapted to allow, on the one hand, the deposit of the propellant in solid form on the grid 6, when the grid 6 is blocked and, on the other hand, the sublimation of the propellant deposited on the grid 6, when the grid is unblocked. By way of non-limitative example, the propellant being diiodine, the deposition temperature extends from ambient temperature to about 120° C. and, preferably, T1 and T2 are adjusted between 40° C. and 120° C.

Optionally, the first thermal regulation system further includes means for cooling case 30 of tank 1. The cooling means comprise for example a cooling circuit in which circulates a heat transfer fluid or a Peltier-effect thermoelectric module or also by infrared radiation. Similarly, as an option, the second thermal regulation system includes other means for cooling plate 3. The other cooling means comprise for example another cooling circuit in which circulates a heat transfer fluid or a Peltier-effect thermoelectric module or also an infrared radiation device. As an alternative, the case 30 and/or the plate 3 include an external coating comprising a paint suitable for radiating heat. As an alternative or as a complement, the tank is designed to form itself a heater.

The operation of the system for on-off control of the gas flow exiting from the tank will now be detailed. This control system (not shown in the figures) further includes a source of energy, an electronic circuit and a calculator, for example of the Proportional-Integral-Derivative (PID) type to control the first thermal regulation system comprising the heating device 11, the second thermal regulation system comprising the other heating device 12, the temperature sensors 21, 22 and one or several pressure and/or gas flow rate sensors.

In the present document, the term "vapor pressure" refers to the pressure exerted by a gas and is generally understood as referring to a saturating vapor pressure, i.e. the pressure of a gas in equilibrium with its liquid or solid form. As known, the vapor pressure of a gas depends on the temperature.

During a first phase, the heating device 11 heats case 30 in such a way that temperature T1 of the case is higher by a predetermined value than the sublimation temperature of the solid propellant 2, for example diiodine, or respectively the evaporation temperature of the liquid propellant. Hence, a gas 9 is formed in the case of the tank 10. Simultaneously, the other heating device 12 heats plate 3 and the grid 6. The first thermal regulation system and the second thermal regulation system operate in such a way as to maintain temperature T2 of grid 6 higher than or equal to temperature T1 of case 30. This operating condition avoids depositing iodine in solid state on grid 6 during this first phase. In other words, the grid 6 is transparent for the passage of the gas. A gas flow 20 formed from the propellant exits from the tank through the opening 4 of the plate 3. Preferably, in this first phase, the first thermal regulation system 11 and the second thermal regulation system 12 are controlled in such a way as to uniformly heat the tank, in other words T1≈T2.

In a second phase, the other heating device 12 is switched in such a way as to reduce temperature T2 of grid 6. For example, the power supply of the other heating device 12 is stopped, while the heating of case 30 via the heating device 11 is maintained. Temperature T2 of grid 6 decreases rapidly, for example by thermal radiation of plate 3. Hence, the temperature difference (T1−T2) becomes positive. Following cooling of plate 3, the temperature difference (T1−T2) between the tank bottom 13 and plate 3 becomes higher in absolute value than a threshold, for example by +10 degrees. When the gas 9, evaporated or sublimated in the tank at the diiodine vapor pressure at temperature T1, enters in contact with the relatively colder walls of the grid 6 placed just opposite the outlet opening 4 of the plate 3, the diiodine is deposited on the grid 6 and/or in the plenum between the grid 6 and the opening 4. More precisely, the temperature gradient between the gas arriving on the grid 6 and the temperature of the grid 6 is between 5° C. and 50° C. The speed of deposition or solidification depends, on the one hand, on temperature T2 of the plate 3 that determines the vapor pressure on this plate, and on the other hand, on temperature T1 of bottom 13 of the tank 1 that determines the vapor pressure of gas 9 coming from the tank bottom. When this temperature difference (T1−T2) between the bottom and the plate 3 is sufficient, it makes it possible to block the holes of the grid 6 and hence to stop the gas flow 20 through the opening 4 of the plate 3. More precisely, the residual gas flow rate through the grid and the opening becomes lower than a maximum acceptable leak rate, for example by about one order of magnitude lower than that of the gas flow in the unblocking conditions of the grid 6.

Figure 6:
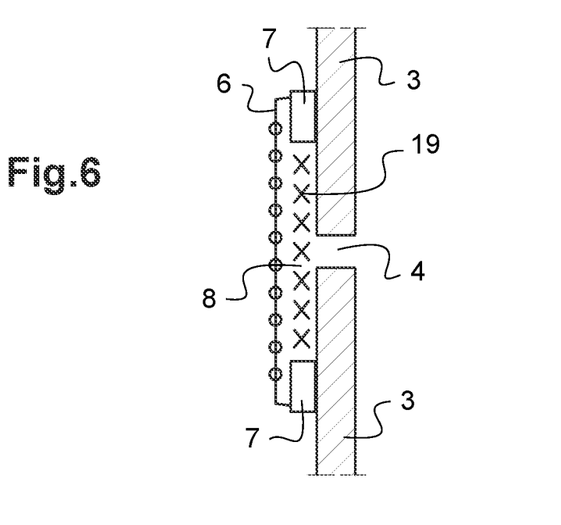
FIG. 6 is a schematic cross-sectional view of the tank outlet in blocking mode.

FIG. 6 shows a detail view of the grid 6 and the opening 4 after this second phase. The deposition area is mainly located on grid 6 and, potentially, in the plenum between the grid 6 and the opening 4 of the plate 3. A solid deposit 19, formed by deposition or solidification of the propellant, obstructs the holes 16 of the grid 6 opposite the opening 4.

The first thermal regulation system 11 and the second thermal regulation system 12 operate as a stop valve at the tank outlet opening 4.

During the second phase, the value of T1 and the value of T2 can change, as long as the difference (T1−T2) remains higher that a positive threshold that has for effect to produce the gas deposition on grid 6 opposite opening 4, in such a way as to maintain the opening blocking. The increase of temperature T1 and/or the decrease of temperature T2 increase the temperature difference (T1−T2). This increase of the temperature difference (T1−T2) may have for effect to modify the speed of the blocking process. For example, if T1−T2 increases, because T2 is reduced, the speed of deposition increases and the solid deposition occurs more rapidly on grid 6.

Particularly advantageously, during the second phase, a system for cooling plate 3 is used to accelerate the decrease of temperature T2 and hence accelerate the speed of blocking by deposition.

In a third phase, the second thermal regulation system 12 is switched again in such a way as to increase temperature T2 of grid 6. More precisely, in this third phase, temperature T2 of grid 6 is caused to be higher than or equal to temperature T1. Hence, the temperature difference (T1−T2) becomes lower than the deposition or solidification threshold. In practice, the temperature difference (T1−T2) becomes negative. The second thermal regulation system 12 hence allows the evaporation or sublimation of deposit 19 on the grid and/or in the plenum and/or in the opening 4. This third phase hence allows rapidly unblocking the holes of grid 6 to let the gas flow 20 pass again through the opening 4 of the plate 3. Generally, the temperature T1 is maintained constant to maintain the gas flow rate once the grid is unblocked.

That way, the grid 6 combined with the first thermal regulation system and the second thermal regulation system operates as an on-off valve at the tank outlet opening 4. The operation of this system for on-off control of the gas flow exiting from the tank is reversible. It may be used many times to open and close on demand holes 16 of grid 6 opposite opening 4.

Figure 7:
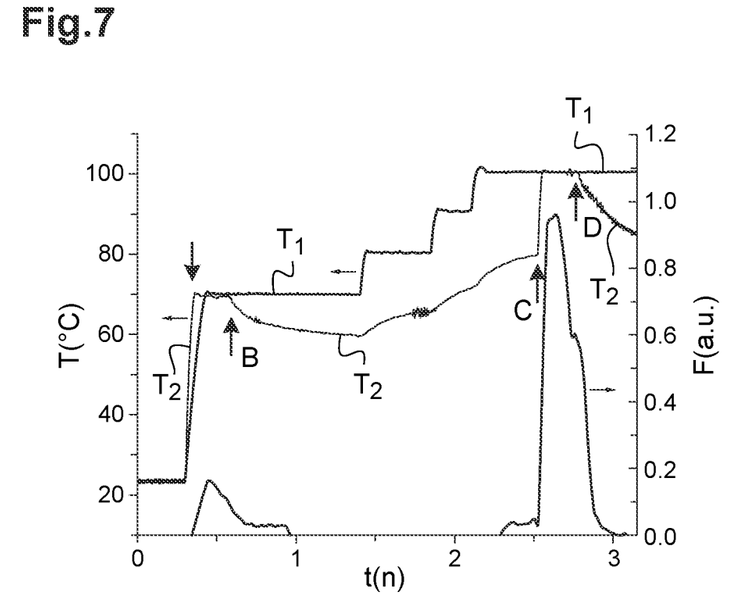
FIG. 7 shows two temperature measurement curves for the bottom plate of the tank (for T1) and the plate including the outlet opening (for T2), respectively, as a function of time, illustrating the operation of the two independent thermal regulation systems in a propellant gas flow on-off control system according to the invention, and a simultaneous measurement of the gas mass flow rate (F) as a function of time at the tank outlet, FIG. 8 schematically shows an ion thruster or a plasma thruster according to a first embodiment, integrating a tank in an ionization chamber or a plasma chamber, respectively, FIG. 9 schematically shows an ion thruster or a plasma thruster according to a second embodiment, comprising a tank arranged remote from an ionization chamber or a plasma chamber, respectively, FIG. 10 schematically shows a satellite or a space probe comprising an ion thruster according to the invention, FIG. 11 schematically shows an example of setpoint temperature curves for the temperature T1 inside the tank and the temperature T2 of the outlet plate of the tank.

FIG. 7 shows, on the ordinate axis on the right of the graph, a measurement of the mass flow rate (F) of the gas flow 20 exiting from a tank 1 according to the present disclosure and measured during the temperature control method also illustrated in FIG. 7, with respect to the ordinate axis on the left of the graph. The solid propellant used in this example is diiodine (12). The result of the different phases can be observed in FIG. 7.

At rest, between the initial time instant (t≈0) and the time instant A (t≈0,3 h), the heating device 11 and the other heating device 12 are stopped. In this resting phase, the temperature T1 and temperature T2 are equal to ambient temperature of about 22° C. In FIG. 7, when the two heating devices are at rest, the gas mass flow rate F is lower than a maximum acceptable gas leak rate and the pressure P at the exit of the tank is lower than 0.15 mTorr. The tank exit pressure of 0.15 mTorr takes into account the base pressure of the chamber into which the gas in injected, for example here a plasma chamber.

In the first phase, between the time instant A (t≈0.3 h) and the time instant B (t≈0.6 h), heating device 11 heats the diiodine to a temperature of about 70° C. and the other heating device 12 heats plate 3 to the same temperature of about 70° C. In FIG. 7, during the first phase (A-B), pressure P increases regularly, in other words, gas mass flow rate F increases, indicating the passage of an increasing gas flow 20.

At the time instant B (t≈0.6 h), the second thermal regulation system is switched in such a way as to reduce temperature T2 of the plate by at least 10° C. with respect to temperature T1 in such a way as to block the holes of grid 6, the plenum opposite opening 4. The second phase extends between the time instant B (t≈0.6 h) and the time instant C (t≈2.5 h). In FIG. 7, at the beginning of the second phase (B-C), pressure P decreases, which indicates a blocking of the gas flow at the tank exit. The gas flow rate F decreases again within a few minutes under the value of the maximum acceptable gas leak rate.

During this second phase, by way of non-limitative example, the heating device 11 heats the diiodine to a temperature T1 increasing by steps. Simultaneously, the other heating device 12 heats plate 3 to an also increasing temperature T2, T2 always remaining lower than T1. More precisely, during this whole second phase, the temperature difference T1−T2 remains higher than +10° C., in such a way as to maintain blocked the holes of grid 6. In FIG. 7, the gas flow rate F remains lower than the value of the maximum acceptable gas leak rate during this whole second phase.

In the third phase, at the time instant C (t≈2.5 h), this other heating device 12 heats the plate in such a way that temperature T2 of the plate is approximately equal to temperature T1 of case 30 of about 100° C., preferably with, in addition, a temperature margin higher than 2 or 3° C. to avoid any solid deposit on grid 6. In FIG. 7, during the third phase (C-D), a rapid increase of mass flow rate F, within a few minutes, is observed, which corresponds to a rapid unblocking of the grid holes 16 opposite the tank outlet opening.

In a fourth phase, from the time instant D (t≈2.8 h), the second thermal regulation system is switched in such a way as to reduce the temperature T2 of the plate by at least 10° C. in such a way as to block the grid holes. In FIG. 7, in the fourth phase (from the time instant D), a very rapid decrease of mass flow rate F induced by a new blocking of the grid holes 16 opposite the tank outlet opening can be observed.

Figure 11:
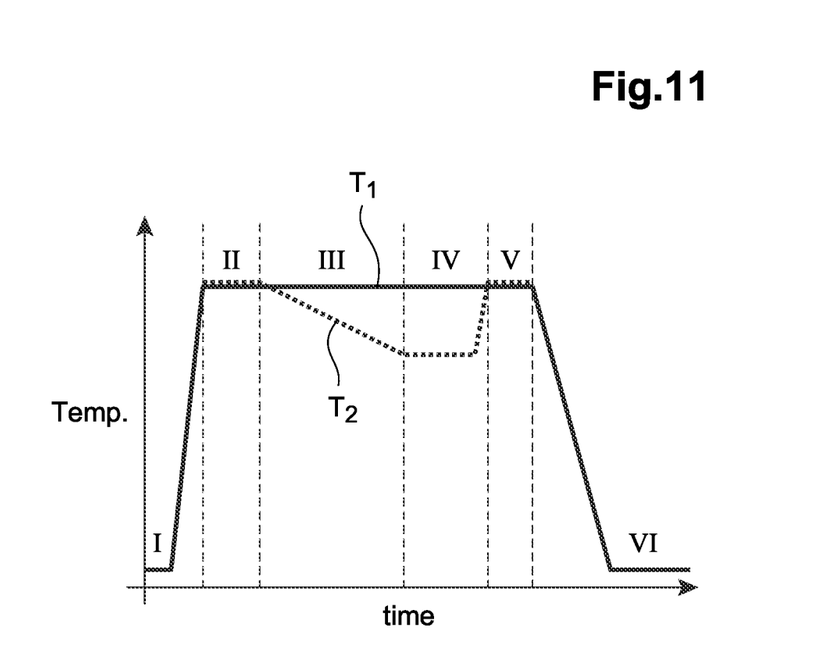

FIG. 11 illustrates an example of setpoint temperature curves for temperature T1 of the tank and temperature T2 of the outlet plate 3 over time.

TABLE 1

| Operating regime | Description | |
|---|---|---|
| I | Ambient temperature and transition state | (T1 − T2)~0 |
| II | Operation, passage of the gas flow | (T1 − T2)~−2; −3° C. |
| III | Principle of deposition into the grid | (T1 − T2) > 0 |
| IV | Grid blocking state, stationary temperature | (T1 − T2) > 0 |
| V | Operation, passage of the gas flow | (T1 − T2)~−2; −3° C. |
| VI | Transition state up to the ambient temperature | (T1 − T2)~0 |

Table 1 indicates the temperature difference T1−T2 during the different operating regimes, illustrated in FIG. 11, of the system for on-off control of the gas flow at the propellant tank exit. At the beginning of operating regime I, the propellant is stored in liquid or gaseous form in the tank, the temperature T1 and the temperature T2 are in equilibrium with ambient temperature and the temperature difference T1−T2 is almost zero. During operating regime I, the temperature T1 and the temperature T2 are simultaneously increased, while the temperature difference T1−T2 is maintained almost zero. During operating regime II, the temperature T1 and the temperature T2 remain almost constant, while the temperature T2 is maintained slightly higher by 2 or 3° C. than the temperature T1, in such a way as to allow the passage of the gas flow through the grid and the outlet opening. During operating regime III, the temperature T1 is maintained constant, the temperature T2 is reduced, the temperature difference T1−T2 becoming positive in such a way as to reach a value higher than a threshold, where the gas forms a solid deposit on the grid, to obstruct the grid holes. During operating regime IV, the temperature T1 and the temperature T2 are maintained constant, in such a way as to maintain the temperature difference T1−T2 positive and higher than the threshold of solid deposition on the grid to maintain the holes blocked by the deposit. Then the temperature T2 is increased, while the temperature T1 is maintained constant, and to reach a temperature difference T1−T2 slightly negative of the order of −2° C. or −3° C., in other words T2 slightly higher than T1, in such a way as to sublimate the deposit on the grid and to allow again the passage of the gas flow through the outlet opening. During operating regime V, the temperature T1 and the temperature T2 are maintained constant, in such a way as to maintain the temperature difference T1−T2 negative of about −2° C. or −3° C., to let open the passage of the gas flow through the grid and the outlet opening. During operating regime VI, the temperature T1 and the temperature T2 are simultaneously reduced, the temperature difference T1–T2 being almost zero, in such a way as to stop the formation of gas in the tank.

The on-off control system according to the present disclosure makes it possible to stop or strongly limit the leaks of propellant when the thruster is stopped. This system for on-off control of the gas flow exiting from the tank hence makes it possible to protect a gas pipe between the tank and an ionization chamber or a plasma chamber, by avoiding the blocking of a gas pipe by diiodine deposition. Moreover, it makes it possible to limit the corrosion of the inner walls of a gas pipe connected to the tank exit. This gas flow on-off control system operates similarly to an on-off valve but its manufacture and use are far simpler than an electronically controlled on-off valve. Moreover, the gas flow on-off control system limits the risk of plugging by corrosion associated with a conventional valve. The gas flow on-off control system of the present disclosure is moreover very robust. The cleaning of the grid 6 is made simply and rapidly by activation of the second thermal regulation system, without requiring maintenance operations with disassembly and reassembly of mechanical or electronic parts. In practice, the gas flow on-off control system of the present disclosure does not modify the global bulk of the tank, because it requires only a grid 6 opposite the tank outlet opening and an additional second thermal regulation system.

The on-off control system of the present disclosure is adapted to different types of space thrusters, in particular ion, plasma or cold-gas thruster. The valve system of the present disclosure may be installed opposite the tank opening. As an alternative, the valve system of the present disclosure can be installed in a gas pipe between the tank and a chamber, for example ion chamber or plasma chamber, or between the tank and an outlet nozzle in the case of a cold-gas thruster.

Figure 8:
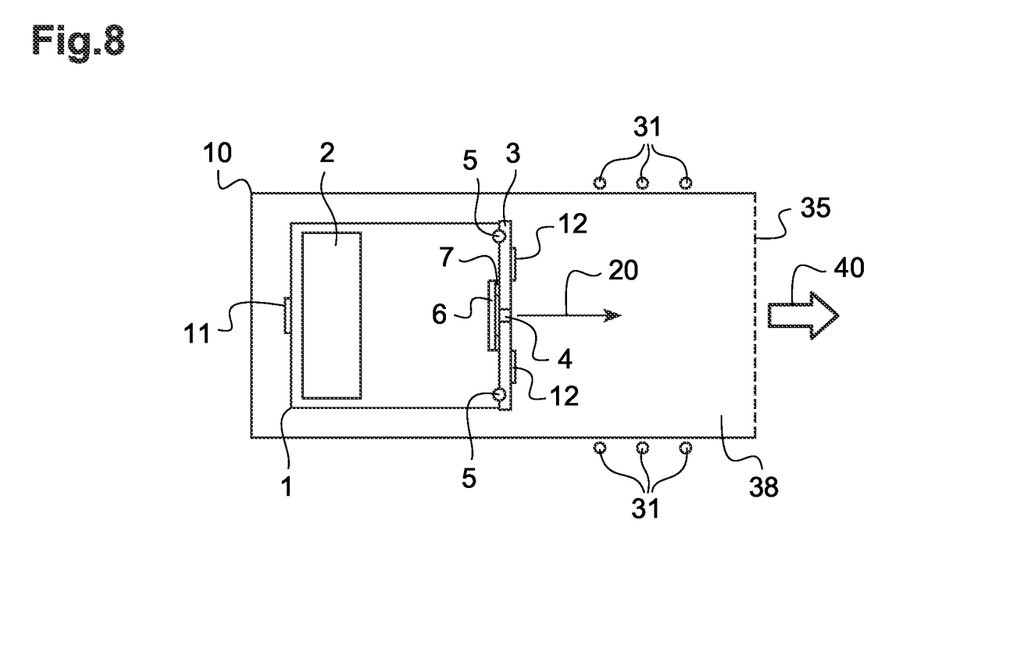
Figure 9:
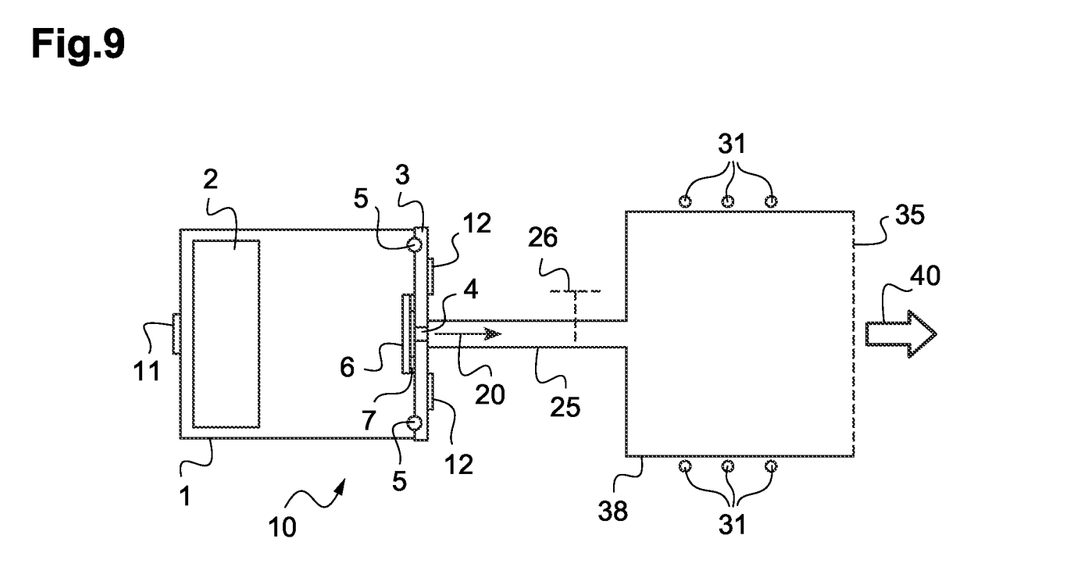

In particular, the invention finds applications in an ion thruster in which the tank is integrated into the plasma chamber (as illustrated in FIG. 8) or remote from the plasma chamber (as illustrated in FIG. 9).

The gas flow on-off control system may also be installed on a colloid, Hall-effect or field-effect thruster.

FIG. 8 shows a cross-sectional view of an ion thruster according to a first embodiment. Ion thruster 10 includes a tank 1 as described in relation with FIG. 1. The tank 1 is herein arranged inside a plasma chamber 38. The tank 1 includes in particular a grid 6 arranged opposite the tank outlet opening 4, a first thermal regulation system comprising a heating device 11 and a second thermal regulation system comprising another heating device 12 to heat and cool independently the tank bottom and the plate 3. The ion thruster 10 further includes a plasma generator 31 comprising for example an induction coil. The plasma generator 31 is adapted to generate a plasma in plasma chamber 38 in presence of the propellant coming from tank 1, at determined pressure and temperature. The ion thruster 10 further includes a system 35 for extraction of a beam of charged particles 40. The beam of charged particles 40 comprises at least ions extracted from the plasma. The gas flow on-off control system is easily integrated inside ion thruster 10 illustrated in FIG. 8, without modifying significantly its bulk and its whole weight.

FIG. 9 shows a cross-sectional view of an ion thruster according to a second embodiment. In this embodiment, the tank 1 is placed remote from the plasma chamber 38 and from the plasma generator 31. A gas pipe 25 connects the outlet opening 4 of tank 1 to the plasma chamber 38. Optionally, a flow-rate control valve 26 is placed on the gas pipe 25 in order to regulate the gas flow rate 20 entering the plasma chamber 38. In this second embodiment, the gas flow on-off control system makes it possible to block the gas flow at the inlet of gas pipe 25 and hence limits the corrosion and/or the plugging of the gas pipe induced by a gas leak from the tank.

The ion thruster of the present disclosure finds applications in particular in the manufacturing of space crafts, for example satellite or space probe, of small size and low weight.

Figure 10:
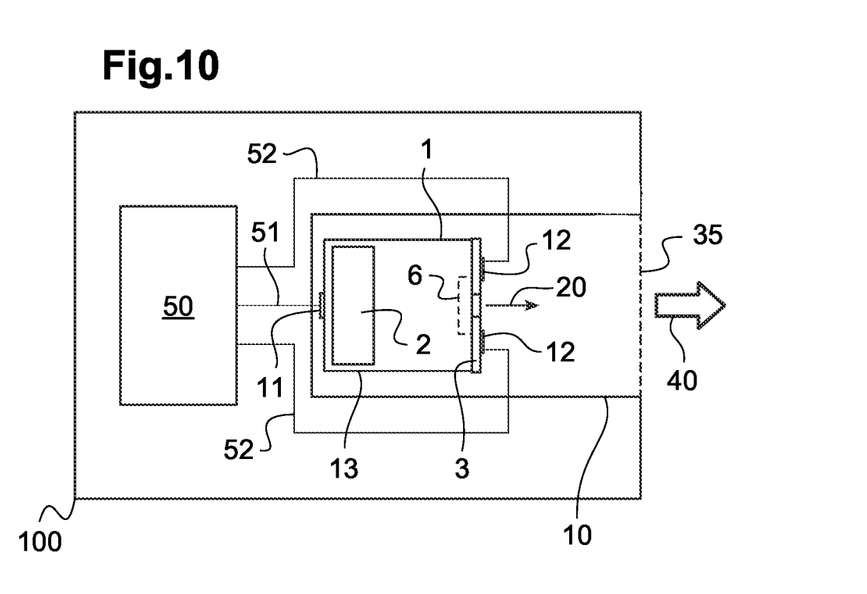

FIG. 10 schematically shows a cross-sectional view of a space craft 100 comprising an ion thruster according to the invention. The space craft 100 comprises a source of energy 50, for example based on solar panels and on-board microprocessor (not shown) to control the operation of ion thruster 10. An electric circuit 51 links the source of energy 50 to the first thermal regulation system comprising the heating device 11 and, respectively an electric circuit 52 links the source of energy 50 to the second thermal regulation system comprising the other heating device 12. The satellite or the space probe hence makes it possible to control the flow of gas exiting from the tank via the on-off control system of the present disclosure.

Of course, various other modifications may be made to the invention within the framework of the appended claims.

The invention claimed is:

1. A thruster tank configured to store a solid or liquid propellant, the tank comprising:
   a heater configured to heat the tank and form a gas from the solid or liquid propellant in the tank;
   an opening having a surface area configured to extract a flow of the propellant gas from the tank; and
   a system for on-off control of the flow of gas, the system comprising
      a grid configured opposite the opening of the tank, the grid including holes, the holes having a total surface area greater than the surface area of the opening of the tank,
      a first thermal regulation system configured to regulate a temperature of the gas in the tank, and
      a second thermal regulation system configured to regulate a temperature of the grid, the first and second thermal regulation systems being configured to adjust a temperature difference between the temperature of the gas in the tank and the temperature of the grid, the temperature difference being variable between a first value higher than a threshold to transmit the gas flow through the grid and a second value lower than another threshold where the gas forms a solid deposit on the grid to obstruct the holes of the grid.

2. The tank according to claim 1, wherein one or more of:
   (i) the first thermal regulation system comprises the heater, and
   (ii) the second thermal regulation system comprises another heating device configured to heat the grid.

3. The tank according to claim 2, wherein the tank includes a case and a plate, a seal disposed between the case and the plate, the plate including the opening of the tank, the grid being fastened to the plate.

4. The tank according to claim 2, wherein the propellant includes a component chosen among the following components: diiodine, bismuth, cesium, cadmium, tin, indium, gallium, germanium, lithium, mercury, adamantane, ferrocene, arsenic, polyvinyl chloride, polyimide and polytetrafluoroethylene.

5. The tank according to claim 1, wherein the tank includes a case and a plate, a seal disposed between the case and the plate, the plate including the opening of the tank, the grid being fastened to the plate.

6. The tank according to claim 5, wherein the propellant includes a component chosen among the following components: diiodine, bismuth, cesium, cadmium, tin, indium, gallium, germanium, lithium, mercury, adamantane, ferrocene, arsenic, polyvinyl chloride, polyimide and polytetrafluoroethylene.

7. The tank according to claim 1, wherein one of:
(i) the grid is a wire mesh grid, and
(ii) the grid includes a blade comprising the holes.

8. The tank according to claim 7, wherein the grid is the wire mesh grid, and wires of the wire mesh grid have a surface roughness adapted for the solid deposit of the propellant.

9. The tank according to claim 8, wherein the propellant includes a component chosen among the following components: diiodine, bismuth, cesium, cadmium, tin, indium, gallium, germanium, lithium, mercury, adamantane, ferrocene, arsenic, polyvinyl chloride, polyimide and polytetrafluoroethylene.

10. The tank according to claim 7, wherein the grid includes the blade with the holes, and the holes have a spatial distribution according to a periodic or a spatial distribution varying radially.

11. The tank according to claim 7, wherein the propellant includes a component chosen among the following components: diiodine, bismuth, cesium, cadmium, tin, indium, gallium, germanium, lithium, mercury, adamantane, ferrocene, arsenic, polyvinyl chloride, polyimide and polytetrafluoroethylene.

12. The tank according to claim 1, wherein the propellant includes a component chosen among the following components: diiodine, bismuth, cesium, cadmium, tin, indium, gallium, germanium, lithium, mercury, adamantane, ferrocene, arsenic, polyvinyl chloride, polyimide and polytetrafluoroethylene.

13. A thruster comprising:
the thruster tank according to claim 1,
wherein the thruster being chosen among one of the following: an ion thruster, a plasma thruster, a cold-gas thruster, a colloid thruster, a Hall-effect thruster, and a field-effect thruster.

14. The thruster according to claim 13, wherein the thruster is the plasma thruster, the tank being separated from a plasma chamber, a gas pipe connecting the tank to the plasma chamber.

15. The thruster according to claim 13, wherein the tank is integrated into a plasma chamber.

16. A spacecraft comprising:
the thruster according to claim 13.

* * * * *